(12) United States Patent
Sharma et al.

(10) Patent No.: US 9,872,199 B2
(45) Date of Patent: Jan. 16, 2018

(54) ASSIGNING A VARIABLE QCI FOR A CALL AMONG A PLURALITY OF USER DEVICES

(71) Applicant: QUALCOMM Incorporated, San Diego, CA (US)

(72) Inventors: Sandeep Sharma, San Diego, CA (US); Nivedita Sarkar, San Diego, CA (US); Shriram Ganesh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/860,928

(22) Filed: Sep. 22, 2015

(65) Prior Publication Data

US 2017/0086090 A1   Mar. 23, 2017

(51) Int. Cl.
 *H04W 72/00* (2009.01)
 *H04W 28/02* (2009.01)
 *H04L 29/06* (2006.01)

(52) U.S. Cl.
 CPC ....... *H04W 28/0268* (2013.01); *H04L 65/403* (2013.01)

(58) Field of Classification Search
 CPC ............................................. H04W 4/00–4/02
 See application file for complete search history.

(56) References Cited

U.S. PATENT DOCUMENTS

| 7,284,201 | B2 | 10/2007 | Cohen-Solal |
| 7,403,487 | B1 | 7/2008 | Foladare et al. |
| 7,656,824 | B2 | 2/2010 | Wang et al. |
| 7,768,543 | B2 | 8/2010 | Christiansen et al. |
| 7,949,117 | B2 | 5/2011 | Jeong et al. |
| 8,516,105 | B2 | 8/2013 | Chawla et al. |
| 8,526,336 | B2 | 9/2013 | Sarkar et al. |
| 8,666,048 | B2 | 3/2014 | Beerse et al. |
| 8,902,970 | B1 | 12/2014 | McCuller |

| 2005/0099492 | A1 | 5/2005 | Orr | |
| 2013/0125155 | A1 | 5/2013 | Bhagavathy et al. | |
| 2013/0170350 | A1* | 7/2013 | Sarkar | H04W 28/24 370/235 |
| 2013/0194919 | A1 | 8/2013 | Garavaglia et al. | |
| 2014/0003450 | A1 | 1/2014 | Bentley et al. | |
| 2014/0130073 | A1 | 5/2014 | Yu et al. | |
| 2014/0341031 | A1 | 11/2014 | Mutikainen | |
| 2015/0098323 | A1 | 4/2015 | Lim et al. | |
| 2015/0105094 | A1* | 4/2015 | Kotecha | H04W 24/02 455/452.2 |
| 2015/0271087 | A1* | 9/2015 | Yiu | H04L 47/35 370/230 |

FOREIGN PATENT DOCUMENTS

| WO | 2007113580 A1 | 10/2007 |
| WO | 2012072276 A1 | 6/2012 |

OTHER PUBLICATIONS

International Search Report and Written Opinion—PCT/US2016/050682—ISA/EPO—dated Nov. 17, 2016 (153321WO).

* cited by examiner

*Primary Examiner* — San Htun
(74) *Attorney, Agent, or Firm* — Muncy, Geissler, Olds & Lowe, P.C./Qualcomm

(57) ABSTRACT

Disclosed is a method for assigning a variable Quality of Service (QoS) Class Identifier (QCI) for a call among a plurality of user devices by determining an initial QCI for the call based on one or more metrics related to the plurality of user devices, assigning the initial QCI for the call to the plurality of user devices or to a first user device of the plurality of user devices, determining a second QCI for the call, wherein the second QCI is based on a plurality of user engagement scores and information related to the one or more metrics received from the plurality of user devices, and assigning the second QCI for the call to the plurality of user devices or to the first user device of the plurality of user devices.

28 Claims, 9 Drawing Sheets

ASSIGNING A VARIABLE QCI FOR A CALL AMONG A PLURALITY OF USER DEVICES

INTRODUCTION

Aspects of this disclosure relate generally to telecommunications, and more particularly to assigning a variable Quality of Service (QoS) Class Identifier (QCI) for a call among a plurality of user devices.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as Long Term Evolution (LTE) provided by the Third Generation Partnership Project (3GPP), Ultra Mobile Broadband (UMB) and Evolution Data Optimized (EV-DO) provided by the Third Generation Partnership Project 2 (3GPP2), 802.11 provided by the Institute of Electrical and Electronics Engineers (IEEE), etc.

More recently, Long Term Evolution (LTE) has been developed as a wireless communications protocol for wireless communication of high-speed data for mobile phones and other data terminals. LTE is based on GSM, and includes contributions from various GSM-related protocols such as Enhanced Data rates for GSM Evolution (EDGE), and Universal Mobile Telecommunications System (UMTS) protocols such as High-Speed Packet Access (HSPA).

SUMMARY

The following presents a simplified summary relating to one or more aspects and/or embodiments associated with the mechanisms disclosed herein for assigning a variable Quality of Service (QoS) Class Identifier (QCI) for a call among a plurality of user devices. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

A method of assigning a variable QCI for a call among a plurality of user devices includes determining, by a network entity, an initial QCI for the call based on one or more metrics related to the plurality of user devices, assigning, by the network entity, the initial QCI for the call to the plurality of user devices or to a first user device of the plurality of user devices, determining, at the network entity, a second QCI for the call, wherein the second QCI is based on a plurality of user engagement scores and information related to the one or more metrics received from the plurality of user devices, and wherein each user engagement score of the plurality of user engagement scores is based on a plurality of factors and indicates a level of engagement with the call of a user of a user device of the plurality of user devices from which the user engagement score was received, and assigning, by the network entity, the second QCI for the call to the plurality of user devices or to the first user device of the plurality of user devices.

An apparatus for assigning a variable QCI for a call among a plurality of user devices includes at least one processor configured to execute a plurality of modules including: a module configured to determine an initial QCI for the call based on one or more metrics related to the plurality of user devices, a module configured to assign the initial QCI for the call to the plurality of user devices or to a first user device of the plurality of user devices, a module configured to determine a second QCI for the call, wherein the second QCI is based on a plurality of user engagement scores and information related to the one or more metrics received from the plurality of user devices, and wherein each user engagement score of the plurality of user engagement scores is based on a plurality of factors and indicates a level of engagement with the call of a user of a user device of the plurality of user devices from which the user engagement score was received, and a module configured to assign the second QCI for the call to the plurality of user devices or to the first user device of the plurality of user devices.

An apparatus for assigning a variable QCI for a call among a plurality of user devices includes means for determining, by a network entity, an initial QCI for the call based on one or more metrics related to the plurality of user devices, means for assigning, by the network entity, the initial QCI for the call to the plurality of user devices or to a first user device of the plurality of user devices, means for determining, at the network entity, a second QCI for the call, wherein the second QCI is based on a plurality of user engagement scores and information related to the one or more metrics received from the plurality of user devices, and wherein each user engagement score of the plurality of user engagement scores is based on a plurality of factors and indicates a level of engagement with the call of a user of a user device of the plurality of user devices from which the user engagement score was received, and means for assigning, by the network entity, the second QCI for the call to the plurality of user devices or to the first user device of the plurality of user devices.

A non-transitory computer-readable medium for assigning a variable QCI for a call among a plurality of user devices includes at least one instruction to determine, by a network entity, an initial QCI for the call based on one or more metrics related to the plurality of user devices, at least one instruction to assign, by the network entity, the initial QCI for the call to the plurality of user devices or to a first user device of the plurality of user devices, at least one instruction to determine, at the network entity, a second QCI for the call, wherein the second QCI is based on a plurality of user engagement scores and information related to the one or more metrics received from the plurality of user devices, and wherein each user engagement score of the plurality of user engagement scores is based on a plurality of factors and indicates a level of engagement with the call of a user of a user device of the plurality of user devices from which the user engagement score was received, and at least one instruction to assign, by the network entity, the second QCI for the call to the plurality of user devices or to the first user device of the plurality of user devices.

Other objects and advantages associated with the mechanisms disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
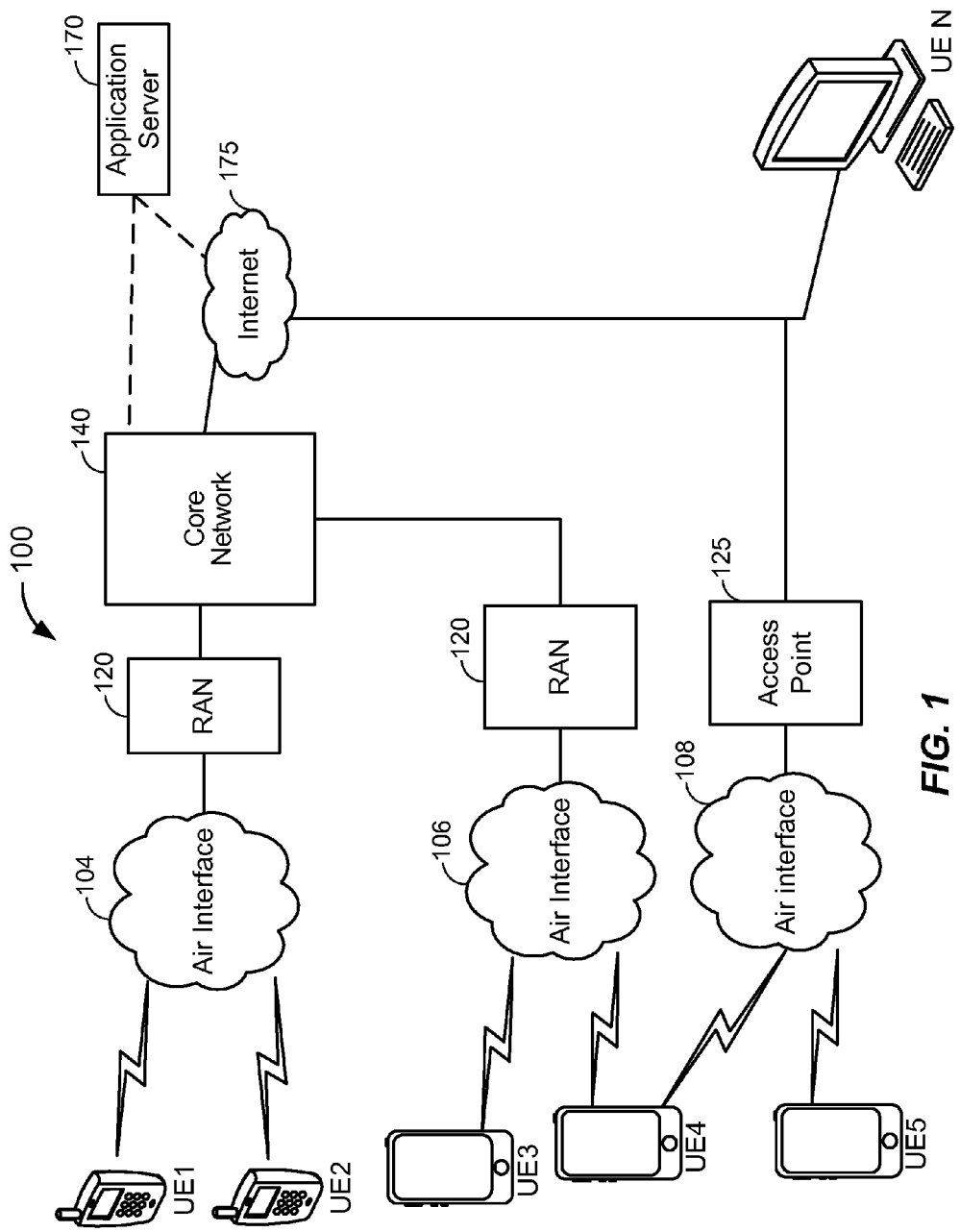
FIG. 1 illustrates a high-level system architecture of a wireless communications system in accordance with an embodiment of the disclosure.

The disclosure is directed to assigning a variable Quality of Service (QoS) Class Identifier (QCI) for a call among a plurality of user devices. In an embodiment, a network entity determines an initial QCI for the call based on one or more metrics related to the plurality of user devices, assigns the initial QCI for the call to the plurality of user devices or to a first user device of the plurality of user devices, determines a second QCI for the call, wherein the second QCI is based on a plurality of user engagement scores and information related to the one or more metrics received from the plurality of user devices, and wherein each user engagement score of the plurality of user engagement scores is based on a plurality of factors and indicates a level of engagement with the call of a user of a user device of the plurality of user devices from which the user engagement score was received, and assigns the second QCI for the call to the plurality of user devices or to the first user device of the plurality of user devices.

These and other aspects of the disclosure are disclosed in the following description and related drawings directed to specific embodiments of the disclosure. Alternate embodiments may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the disclosure" does not require that all embodiments of the disclosure include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A client device, referred to herein as a user equipment (UE), may be mobile or stationary, and may communicate with a radio access network (RAN). As used herein, the term "UE" may be referred to interchangeably as an "access terminal" or "AT," a "wireless device," a "subscriber device," a "subscriber terminal," a "subscriber station," a "user terminal" or UT, a "mobile terminal," a "mobile station," a "user device" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a high-level system architecture of a wireless communications system 100 in accordance with an embodiment of the disclosure. The wireless communications system 100 contains UEs 1 . . . N. The UEs 1 . . . N can include cellular telephones, personal digital assistant (PDAs), pagers, a laptop computer, a desktop computer, and so on. For example, in FIG. 1, UEs 1 . . . 2 are illustrated as cellular calling phones, UEs 3 . . . 5 are illustrated as cellular touchscreen phones or smart phones, and UE N is illustrated as a desktop computer or PC.

Referring to FIG. 1, UEs 1 . . . N are configured to communicate with an access network (e.g., the RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., CDMA, EVDO, eHRPD, GSM, EDGE, W-CDMA, LTE, etc.), while the air interface 108 can comply with a wireless IP protocol (e.g., IEEE 802.11). The RAN 120 includes a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to bridge packet-switched data communications between UE N and UEs 1 . . . N via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1, an application server 170 is shown as connected to the Internet 175, the core network 140, or both.

The application server 170 can be implemented as a plurality of structurally separate servers, or alternately may correspond to a single server. As will be described below in more detail, the application server 170 is configured to support one or more communication services (e.g., Voice-over-Internet Protocol (VoIP) sessions, Voice-over-LTE (VoLTE) sessions, Push-to-Talk (PTT) sessions, group communication sessions, social networking services, etc.) for UEs that can connect to the application server 170 via the core network 140 and/or the Internet 175.

Examples of protocol-specific implementations for the RAN 120 and the core network 140 are provided below with respect to FIGS. 2A through 2B to help explain the wireless communications system 100 in more detail. In particular, the components of the RAN 120 and the core network 140 corresponds to components associated with supporting packet-switched (PS) communications, whereby legacy circuit-switched (CS) components may also be present in these networks, but any legacy CS-specific components are not shown explicitly in FIGS. 2A-2B.

Figure 2A:
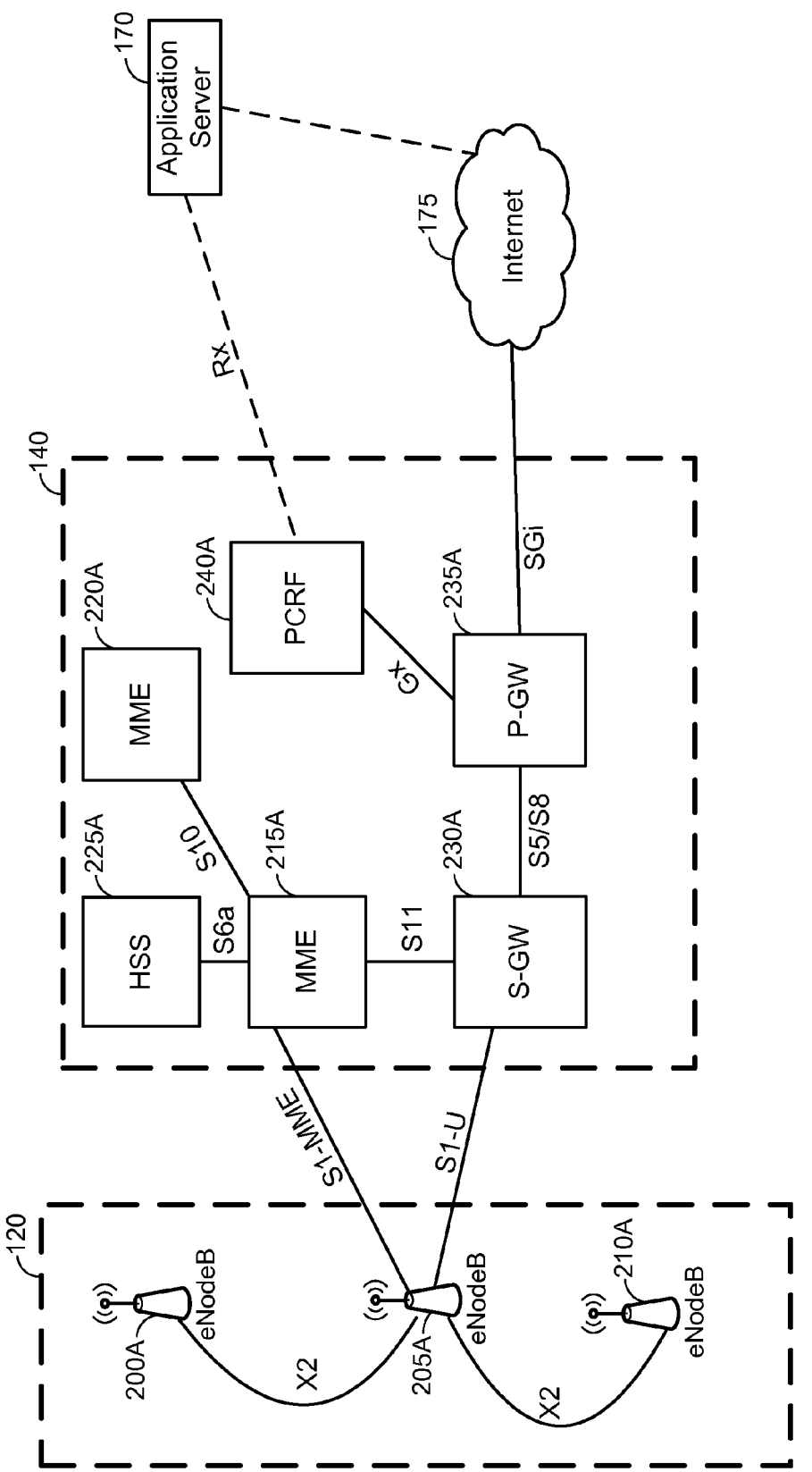
FIG. 2A illustrates an example configuration of the radio access network (RAN) and a packet-switched portion of the core network that is based on an Evolved Packet System (EPS) or Long Term Evolution (LTE) network in accordance with an embodiment of the disclosure.

FIG. 2A illustrates an example configuration of the RAN 120 and a packet-switched portion of the core network 140 based on an Evolved Packet System (EPS) or LTE network, in accordance with an embodiment of the disclosure. Referring to FIG. 2A, the RAN 120 in the EPS/LTE network is configured with a plurality of Evolved Node Bs (eNodeBs or eNBs) 200A, 205A, and 210A. Unlike earlier cellular generations, the eNodeBs in EPS/LTE networks do not require a separate controller (i.e., a radio network controller (RNC)) within the RAN 120 to communicate with the core network 140. In other words, some of the functionality of the RNC is built into each respective eNodeB of the RAN 120 in FIG. 2A.

In FIG. 2A, the core network 140 includes a plurality of Mobility Management Entities (MMEs) 215A and 220A, a Home Subscriber Server (HSS) 225A, a Serving Gateway (S-GW) 230A, a Packet Data Network Gateway (P-GW) 235A and a Policy and Charging Rules Function (PCRF) 240A. Network interfaces between these components, the RAN 120 and the Internet 175 are illustrated in FIG. 2A and are defined in Table 1 (below) as follows:

TABLE 1

EPS/LTE Core Network Connection Definitions

| Network Interface | Description |
| --- | --- |
| S1-MME | Reference point for the control plane protocol between RAN 120 and MME 215A. |
| S1-U | Reference point between RAN 120 and S-GW 230A for the per bearer user plane tunneling and inter-eNodeB path switching during handover. |
| S5 | Provides user plane tunneling and tunnel management between S-GW 230A and P-GW 235A. It is used for S-GW relocation due to UE mobility and if the S-GW 230A needs to connect to a non-collocated P-GW for the required Public Data Network (PDN) connectivity. |
| S6a | Enables transfer of subscription and authentication data for authenticating/authorizing user access to the evolved system (Authentication, Authorization, and Accounting (AAA) interface) between MME 215A and HSS 225A. |
| Gx | Provides transfer of Quality of Service (QoS) policy and charging rules from PCRF 240A to Policy and Charging Enforcement Function (PCEF) component (not shown) in the P-GW 235A. |
| S8 | Inter-PLMN reference point providing user and control plane between the S-GW 230A in a Visited Public Land Mobile Network (VPLMN) and the P-GW 235A in a Home Public Land Mobile Network (HPLMN). S8 is the inter-PLMN variant of S5. |

TABLE 1-continued

EPS/LTE Core Network Connection Definitions

| Network Interface | Description |
|---|---|
| S10 | Reference point between MMEs 215A and 220A for MME relocation and MME to MME information transfer. |
| S11 | Reference point between MME 215A and S-GW 230A. |
| SGi | Reference point between the P-GW 235A and the packet data network, shown in FIG. 2A as the Internet 175. The Packet data network may be an operator external public or private packet data network or an intra-operator packet data network (e.g., for provision of IMS services). This reference point corresponds to Gi for 3GPP accesses. |
| X2 | Reference point between two different eNodeBs used for UE handoffs. |
| Rx | Reference point between the PCRF 240A and an application function (AF) that is used to exchanged application-level session information, where the AF is represented in FIG. 1 by the application server 170. |

A high-level description of the components shown in the RAN 120 and core network 140 of FIG. 2A will now be described. However, these components are each well-known in the art from various 3GPP TS standards, and the description contained herein is not intended to be an exhaustive description of all functionalities performed by these components.

Referring to FIG. 2A, the MMEs 215A and 220A are configured to manage the control plane signaling for the EPS bearers. MME functions include: Non-Access Stratum (NAS) signaling, NAS signaling security, Mobility management for inter- and intra-technology handovers, P-GW and S-GW selection, and MME selection for handovers with MME change.

Referring to FIG. 2A, the S-GW 230A is the gateway that terminates the interface toward the RAN 120. For each UE associated with the core network 140 for an EPS-based system, at a given point of time, there is a single S-GW. The functions of the S-GW 230A, for both the GTP-based and the Proxy Mobile IPv6 (PMIP)-based S5/S8, include: Mobility anchor point, Packet routing and forwarding, and setting the DiffServ Code Point (DSCP) based on a QoS Class Identifier (QCI) of the associated EPS bearer.

Referring to FIG. 2A, the P-GW 235A is the gateway that terminates the SGi interface toward the PDN, e.g., the Internet 175. If a UE is accessing multiple PDNs, there may be more than one P-GW for that UE; however, a mix of S5/S8 connectivity and Gn/Gp connectivity is not typically supported for that UE simultaneously. P-GW functions include for both the GTP-based S5/S8: Packet filtering (by deep packet inspection), UE IP address allocation, setting the DSCP based on the QCI of the associated EPS bearer, accounting for inter operator charging, uplink (UL) and downlink (DL) bearer binding as defined in 3GPP TS 23.203, UL bearer binding verification as defined in 3GPP TS 23.203. The P-GW 235A provides PDN connectivity to both GSM/EDGE Radio Access Network (GERAN)/ UTRAN only UEs and E-UTRAN-capable UEs using any of E-UTRAN, GERAN, or UTRAN. The P-GW 235A provides PDN connectivity to E-UTRAN capable UEs using E-UTRAN only over the S5/S8 interface.

Referring to FIG. 2A, the PCRF 240A is the policy and charging control element of the EPS-based core network 140. In a non-roaming scenario, there is a single PCRF in the HPLMN associated with a UE's Internet Protocol Connectivity Access Network (IP-CAN) session. The PCRF terminates the Rx interface and the Gx interface. In a roaming scenario with local breakout of traffic, there may be two PCRFs associated with a UE's IP-CAN session: A Home PCRF (H-PCRF) is a PCRF that resides within a HPLMN, and a Visited PCRF (V-PCRF) is a PCRF that resides within a visited VPLMN. PCRF is described in more detail in 3GPP TS 23.203, and as such will not be described further for the sake of brevity. In FIG. 2A, the application server 170 (e.g., which can be referred to as the AF in 3GPP terminology) is shown as connected to the core network 140 via the Internet 175, or alternatively to the PCRF 240A directly via an Rx interface. Generally, the application server 170 (or AF) is an element offering applications that use IP bearer resources with the core network (e.g. UMTS PS domain/GPRS domain resources/LTE PS data services). One example of an application function is the Proxy-Call Session Control Function (P-CSCF) of the IP Multimedia Subsystem (IMS) Core Network sub system. The AF uses the Rx reference point to provide session information to the PCRF 240A. Any other application server offering IP data services over cellular network can also be connected to the PCRF 240A via the Rx reference point.

Figure 2B:
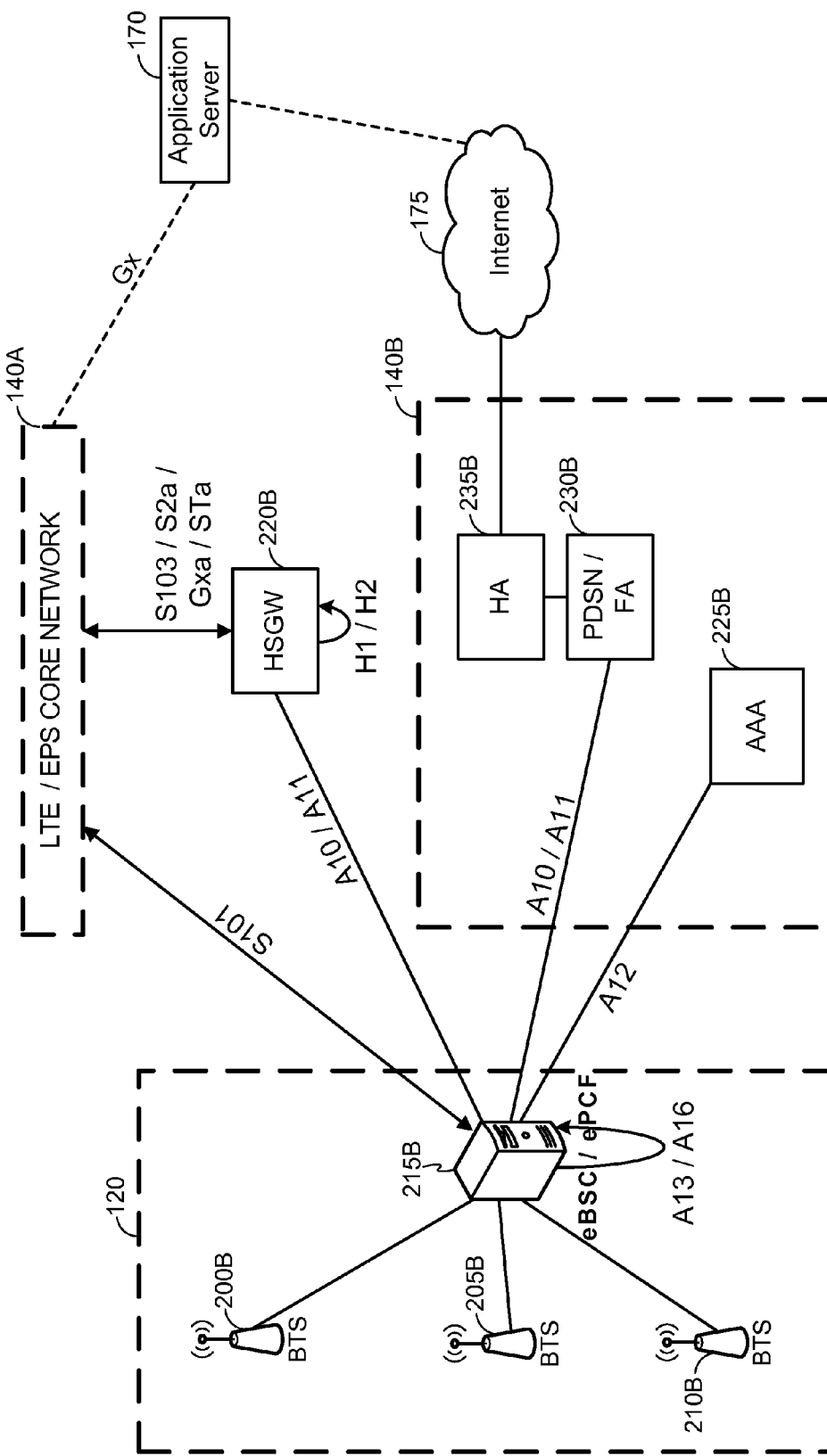
FIG. 2B illustrates an example configuration of an enhanced High Rate Packet Data (HRPD) RAN connected to an EPS or LTE network and also a packet-switched portion of an HRPD core network in accordance with an embodiment of the disclosure.

FIG. 2B illustrates an example of the RAN 120 configured as an enhanced High Rate Packet Data (HRPD) RAN connected to an EPS or LTE network 140A and also a packet-switched portion of an HRPD core network 140B in accordance with an embodiment of the disclosure. The core network 140A is an EPS or LTE core network, similar to the core network described above with respect to FIG. 2A.

In FIG. 2B, the eHRPD RAN includes a plurality of base transceiver stations (BTSs) 200B, 205B, and 210B, which are connected to an enhanced BSC (eBSC) and enhanced PCF (ePCF) 215B. The eBSC/ePCF 215B can connect to one of the MMEs 215A or 220A within the EPS core network 140A over an S101 interface, and to an HRPD serving gateway (HS-GW) 220B over A10 and/or A11 interfaces for interfacing with other entities in the EPS core network 140A (e.g., the S-GW 230A over an S103 interface, the P-GW 235A over an S2a interface, the PCRF 240A over a Gxa interface, a 3GPP AAA server (not shown explicitly in FIG. 2A) over an STa interface, etc.). The HS-GW 220B is defined in 3GPP2 to provide the interworking between HRPD networks and EPS/LTE networks. As will be appreciated, the eHRPD RAN and the HS-GW 220B are configured with interface functionality to EPC/LTE networks that is not available in legacy HRPD networks.

Turning back to the eHRPD RAN, in addition to interfacing with the EPS/LTE network 140A, the eHRPD RAN can also interface with legacy HRPD networks such as HRPD core network 140B. As will be appreciated the HRPD core network 140B is an example implementation of a legacy HRPD network, such as the EV-DO network. For example, the eBSC/ePCF 215B can interface with an authentication, authorization and accounting (AAA) server 225B via an A12 interface, or to a PDSN/FA 230B via an A10 or A11 interface. The PDSN/FA 230B in turn connects to HA 235B, through which the Internet 175 can be accessed. In FIG. 2B, certain interfaces (e.g., A13, A16, H1, H2, etc.) are not described explicitly but are shown for completeness and would be understood by one of ordinary skill in the art familiar with HRPD or eHRPD.

Referring to FIGS. 2A-2B, it will be appreciated that LTE core networks (e.g., FIG. 2A) and HRPD core networks that interface with eHRPD RANs and HS-GWs (e.g., FIG. 2B) can support network-initiated Quality of Service (QoS) and assignment of QCI (e.g., by the P-GW, GGSN, SGSN, etc.) in certain cases.

In LTE networks, QoS is implemented between the UE and the PDN gateway, e.g., the P-GW 235A, and is applied to a set of bearers. A "bearer" is a set of network configurations to provide special treatment to certain traffic. For example, VoIP packets are prioritized over web browser traffic. In LTE, QoS is applied on the radio bearer, the S1 bearer, and the S5/S8 bearer, collectively called the EPS bearer mentioned above.

Figure 3:
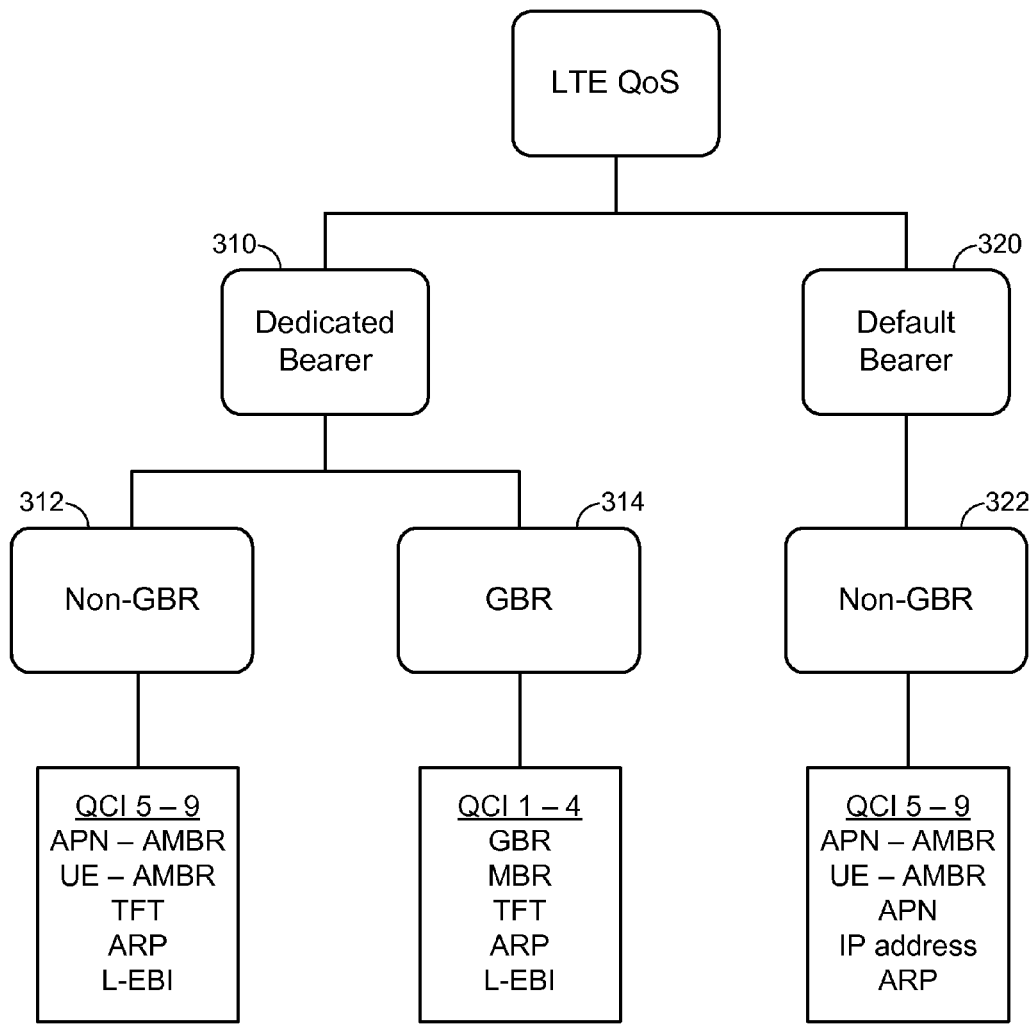
FIG. 3 illustrates different bearer types in LTE and different properties associated with each bearer.

There are different bearer types and different properties associated with each bearer in LTE, as illustrated in FIG. 3. First, there are two types of bearers, dedicated bearers and default bearers, as shown by the reference numbers 310 and 320, respectively. There is at-least one default bearer established when a UE attaches to the LTE network, whereas a dedicated bearer is established when there is a need to provide QoS for a specific service/application (e.g., VoIP, video, etc.). Dedicated bearers can be subdivided into guaranteed bit rate (GBR) and Non-GBR types, as shown by the reference numbers 312 and 314. GBR is the minimum guaranteed bit rate per EPS bearer, and is specified independently for uplink and downlink. The non-GBR bearer, as its name suggests, does not provide a guaranteed bit rate. The default bearer can only be a non-GBR type, as shown by reference number 322.

Another parameter associated with all bearers is QCI. QCI is a scalar denoting a set of transport characteristics (e.g., bearer with/without guaranteed bit rate, priority, packet delay budget, packet error loss rate, etc.) and is used to infer specific parameters related to packet forwarding (e.g., scheduling weights, admission thresholds, queue management thresholds, link-layer protocol configuration, etc.). The packet flow to each application, such as a voice and/or video call, running on a user device is mapped to one of several QCI values according to the level of service (QoS) required by the application. Using QCI avoids having to transmit the full set of QoS-related parameters over the network interfaces and thereby reduces the complexity of QoS negotiation. Currently, there are nine QCI's defined in LTE, as shown in Table 2:

TABLE 2

| QCI | Type of Communication |
| --- | --- |
| 1 | VoIP call, VoLTE call |
| 2 | Video call |
| 3 | Online gaming (real time) |
| 4 | Video streaming |
| 5 | IMS signaling |

TABLE 2-continued

QCI in LTE

| QCI | Type of Communication |
| --- | --- |
| 6 | Video, TCP based services, e.g., email, chat, ftp, etc. |
| 7 | Voice, video, interactive gaming |
| 8 | Video, TCP based services, e.g., email, chat, ftp, etc. |
| 9 | Video, TCP based services, e.g., email, chat, ftp, etc. |

Referring to FIG. 3, the non-GBR bearers represented by reference number 312 may be assigned QCIs 5-9. The QoS parameters for such non-GBR bearers include access point name-aggregate maximum bit rate (APN-AMBR), UE-AMBR, traffic flow template (TFT), allocation and retention priority (ARP), and linked EPS bearer identifier (L-EBI). The GBR bearers represented by reference number 314 may be assigned QCIs 1-4. The QoS parameters for such GBR bearers include the GBR, maximum bit rate (MBR), TFT, ARP, and L-EBI. The non-GBR bearers represented by reference number 322 may be assigned QCIs 5-9. The QoS parameters for such non-GBR bearers include APN-AMBR, UE-AMBR, APN, IP address, and ARP.

Figure 4:
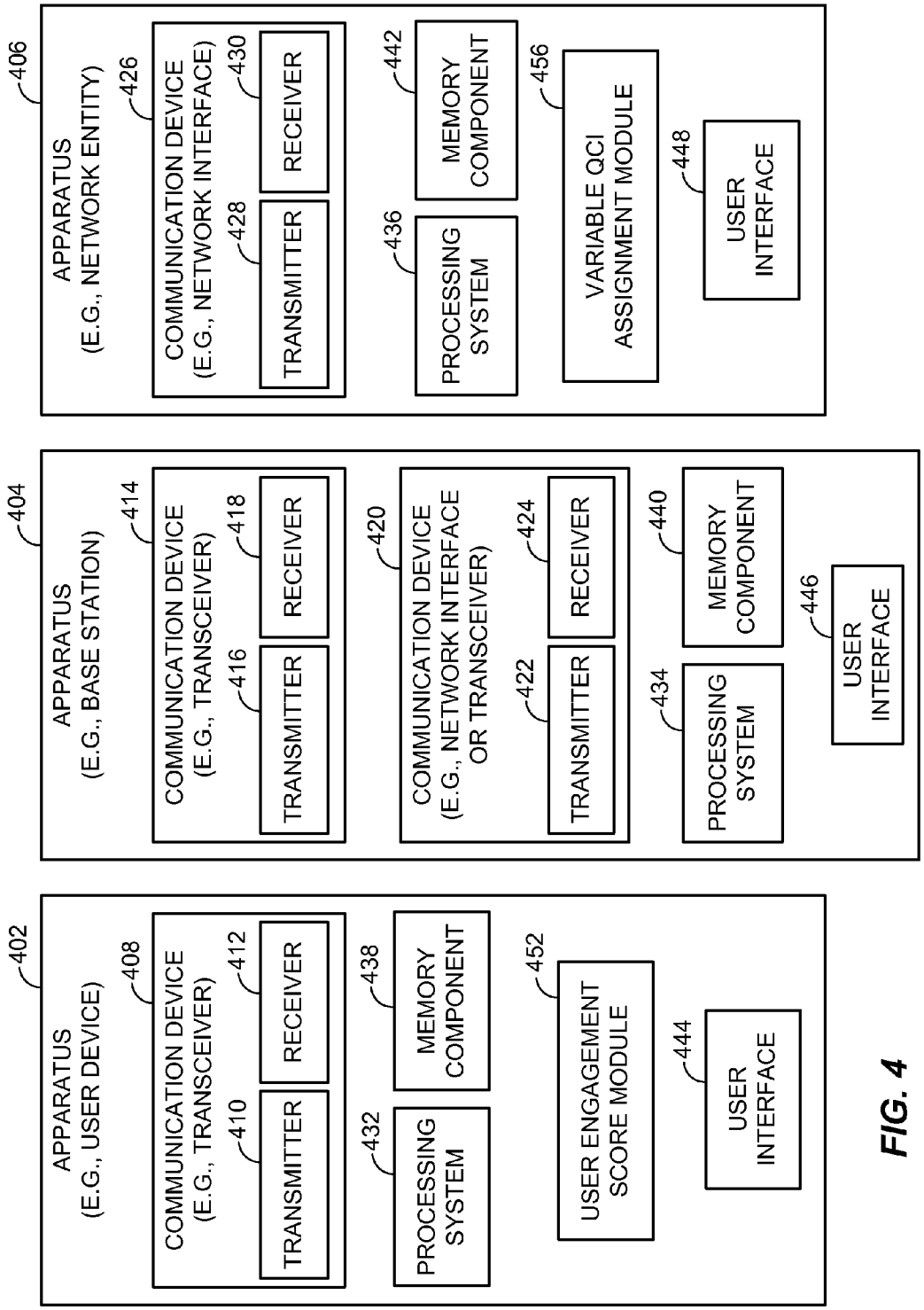
FIG. 4 is a simplified block diagram of several sample aspects of components that may be employed in communication nodes and configured to support communication as taught herein.

FIG. 4 illustrates several sample components (represented by corresponding blocks) that may be incorporated into an apparatus 402, an apparatus 404, and an apparatus 406 (corresponding to, for example, a user device, such as any of UEs 1-N in FIG. 1, a base station, such as any of eNodeBs 200A-210A in FIG. 2A or BTS' 200B-210B in FIG. 2B, and a network entity, such as any component of the core network 140 in FIG. 1, 2A, or 2B, respectively) to support the operations as taught herein. It will be appreciated that these components may be implemented in different types of apparatuses in different implementations (e.g., in an ASIC, in a System-on-Chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The apparatus 402 and the apparatus 404 each include at least one wireless communication device (represented by the communication devices 408 and 414 (and the communication device 420 if the apparatus 404 is a relay)) for communicating with other nodes via at least one designated radio access technology (RAT). Each communication device 408 includes at least one transmitter (represented by the transmitter 410) for transmitting and encoding signals (e.g., messages, indications, information, and so on) and at least one receiver (represented by the receiver 412) for receiving and decoding signals (e.g., messages, indications, information, pilots, and so on). Similarly, each communication device 414 includes at least one transmitter (represented by the transmitter 416) for transmitting signals (e.g., messages, indications, information, pilots, and so on) and at least one receiver (represented by the receiver 418) for receiving signals (e.g., messages, indications, information, and so on). If the apparatus 404 is a relay station, each communication device 420 may include at least one transmitter (represented by the transmitter 422) for transmitting signals (e.g., messages, indications, information, pilots, and so on) and at least one receiver (represented by the receiver 424) for receiving signals (e.g., messages, indications, information, and so on).

A transmitter and a receiver may comprise an integrated device (e.g., embodied as a transmitter circuit and a receiver circuit of a single communication device, such as a transceiver) in some implementations, may comprise a separate transmitter device and a separate receiver device in some implementations, or may be embodied in other ways in other implementations. A wireless communication device (e.g., one of multiple wireless communication devices) of the apparatus 404 may also comprise a Network Listen Module (NLM) or the like for performing various measurements.

The apparatus 406 (and the apparatus 404 if it is not a relay station) includes at least one communication device (represented by the communication device 426 and, optionally, 420) for communicating with other nodes. For example, the communication device 426 may comprise a network interface that is configured to communicate with one or more network entities via a wire-based or wireless backhaul. In some aspects, the communication device 426 may be implemented as a transceiver configured to support wire-based or wireless signal communication. This communication may involve, for example, sending and receiving: messages, parameters, or other types of information. Accordingly, in the example of FIG. 4, the communication device 426 is shown as comprising a transmitter 428 and a receiver 430. Similarly, if the apparatus 404 is not a relay station, the communication device 420 may comprise a network interface that is configured to communicate with one or more network entities via a wire-based or wireless backhaul. As with the communication device 426, the communication device 420 is shown as comprising a transmitter 422 and a receiver 424.

The apparatus 402 may include a user engagement score module 452 for performing user device operations to support assigning a variable QCI for a call among a plurality of user devices, as described herein, such as calculating a user engagement score for the apparatus 402. Similarly, the apparatus 406 may include a variable QCI assignment module 456 for performing network operations to support assigning a variable QCI for a call among a plurality of user devices, as described herein. For example, as described further herein, the variable QCI assignment module 456 may be configured to cause the apparatus 406 to determine an initial QCI for the call based on one or more metrics related to the plurality of user devices, assign the initial QCI for the call to the plurality of user devices or to a first user device of the plurality of user devices, determine a second QCI for the call, wherein the second QCI is based on a plurality of user engagement scores and information related to the one or more metrics received from the plurality of user devices, and wherein each user engagement score of the plurality of user engagement scores is based on a plurality of factors and indicates a level of engagement with the call of a user of a user device of the plurality of user devices from which the user engagement score was received, and assign the second QCI for the call to the plurality of user devices or to the first user device of the plurality of user devices. The user engagement score module 452 and the variable QCI assignment module 456 may be software modules stored in memory components 438 and 442, respectively, circuitry coupled to processing systems 432 and 436, respectively, or a combination of software and hardware.

The apparatuses 402, 404, and 406 also include other components that may be used in conjunction with the operations as taught herein. The apparatus 402 includes a processing system 432 for executing the user engagement score module 452, as taught herein, and for providing other processing functionality. The apparatus 404 includes a processing system 434 for providing functionality relating to, for example, base station operations to support assigning a variable QCI for a call among a plurality of user devices, as described herein, as taught herein, and for providing other processing functionality. The apparatus 406 includes a processing system 436 for executing the variable QCI assignment module 456, as taught herein, and for providing other processing functionality. The apparatuses 402, 404, and 406 include memory components 438, 440, and 442 (e.g., each including a memory device), respectively, for maintaining information (e.g., information indicative of reserved resources, thresholds, parameters, and so on). In addition, the apparatuses 402, 404, and 406 include user interface devices 444, 446, and 448, respectively, for providing indications (e.g., audible and/or visual indications) to a user and/or for receiving user input (e.g., upon user actuation of a sensing device such a keypad, a touch screen, a microphone, and so on).

For convenience, the apparatuses 402, 404, and/or 406 are shown in FIG. 4 as including various components that may be configured according to the various examples described herein. It will be appreciated, however, that the illustrated blocks may have different functionality in different designs.

The components of FIG. 4 may be implemented in various ways. In some implementations, the components of FIG. 4 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 408, 432, 438, and 444 may be implemented by processor and memory component(s) of the apparatus 402 (e.g., by execution of appropriate code and/or by appropriate configuration of processor components). Similarly, some or all of the functionality represented by blocks 414, 420, 434, 440, and 446 may be implemented by processor and memory component(s) of the apparatus 404 (e.g., by execution of appropriate code and/or by appropriate configuration of processor components). Also, some or all of the functionality represented by blocks 426, 436, 442, and 448 may be implemented by processor and memory component(s) of the apparatus 406 (e.g., by execution of appropriate code and/or by appropriate configuration of processor components).

In an embodiment, the UEs 1-N in FIG. 1 may participate in various types of group calls with each other over the RAN 120 and the core network 140, including video conference calls, VoIP calls, VoLTE calls, etc. These types of calls are resource intensive for both the end user devices (UEs 1-N) and the network supporting the video call (RAN 120, core network 140). For example, resources for a video call at the UE level (in particular the graphics processing unit (GPU) and the central processing unit (CPU)) include video frame encoding/decoding, rate, vocoder, frames-per-second (FPS), resolution, etc. Resources at the network level include dedicated bearers for QoS, cell edge bandwidth, eNodeB aggregated maximum bit rate (AMBR) considerations, etc.

Due to the resource intensiveness of video/VoIP/VoLTE telephony, there is a desire to optimize user device and network resources for video telephony. An observation of users on video telephone calls, for example, shows that users are not always fully engaged in the call, or at least the video aspect of the call. For example, a user may be listening to a video call but not watching the video stream, moving around the user device, etc. However, the user device and the network continue allocating the video telephony resources regardless. Thus, video telephony resources could be optimized based on whether users on a video call are engaged to the extent that the device and network resources are well leveraged.

Accordingly, the present disclosure provides a dynamic, adaptive, configurable/modal method to scale user device and/or network resources based on user engagement with a call. The higher the user engagement, the greater the user device and/or network resources assigned to the call, and vice versa.

Figure 5A:
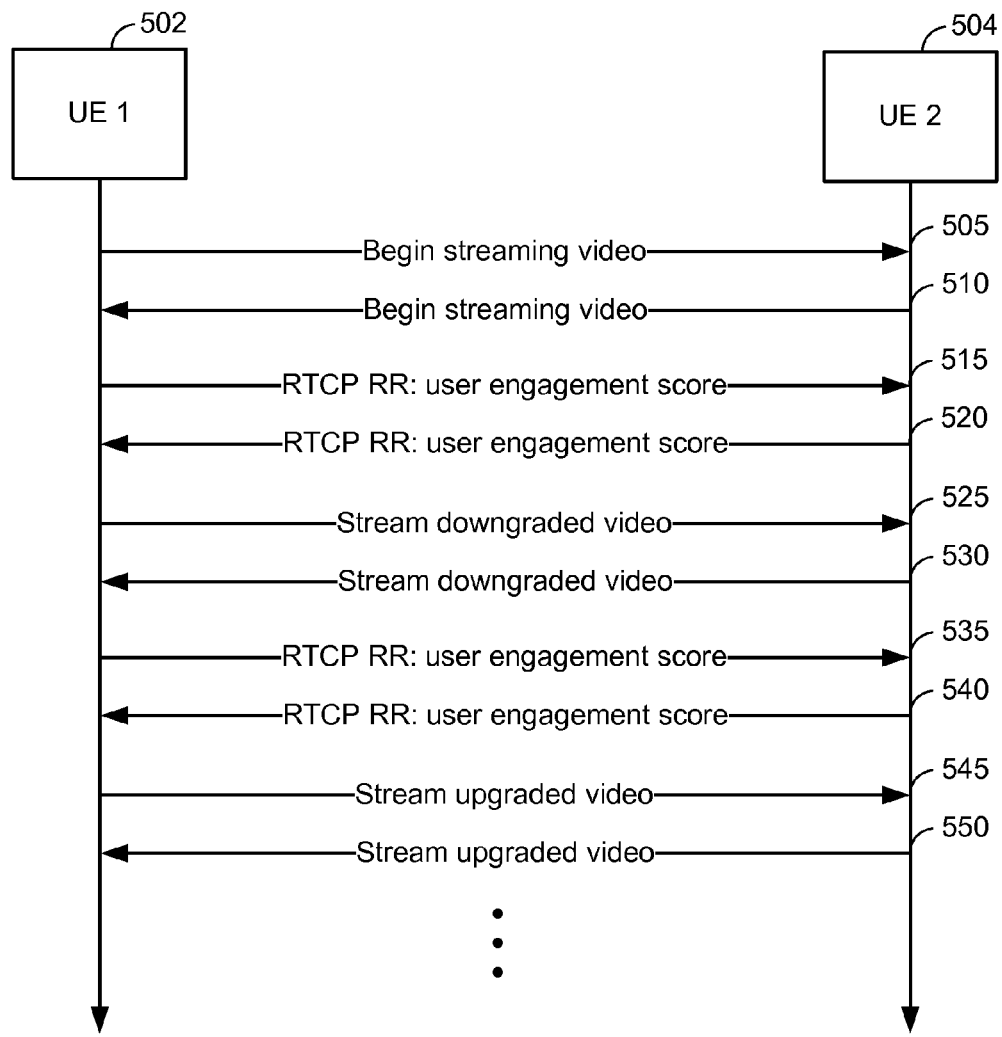
FIG. 5A illustrates an exemplary embodiment in which two UEs participating in a video call exchange their user engagement scores and, in response, adjust the video quality of the video stream being transmitted.

FIG. 5A illustrates an exemplary embodiment in which two UEs participating in a video call exchange their user engagement scores and, in response, adjust the video quality of the video stream being transmitted. In FIG. 5A, each UE 502 and 504 periodically calculates its user engagement score based on multiple factors, described below, and assigns a timestamp indicating the time the user engagement score was calculated. At 505 and 510, the UEs 502 and 504 may begin transmitting their respective video streams to the other UE. The video streams may initially be encoded at a default rate. At 515 and 520, the UEs 502 and 504 exchange their most recent calculated user engagement scores in a Real-time Transport Protocol (RTP) Control Protocol (RTCP) field in a Receiver Report (RR), for example. When the RTCP information is received by the other party, the UEs 502 and 504 can upgrade or downgrade the quality of the video call (e.g., the codec quality/bit rate can be increased/decreased) based on the received user engagement score. In the example of FIG. 5A, at 525 and 530, both UEs 502 and 504 downgrade the quality of their respective video streams.

At the next interval (which may be a periodic interval or may be triggered by an event, such as where the network is congested and needs to make optimal usage of the resources), the UEs 502 and 504 again calculate their respective user engagement scores. At 535 and 540, the UEs 502 and 504 exchange their most recent periodically calculated user engagement scores. The UEs 502 and 504 may exchange user activity scores every time they are calculated, or less frequently. In the example of FIG. 5A, the users' attention has returned to the call. As such, the exchanged user engagement scores are higher, and at 545 and 550, both UEs 502 and 504 upgrade the quality of their respective video streams.

Note that while downscaling the video stream can be an N-modal algorithm that takes into account the length of time user attention is focused on the call, upgrading should be a one-step upscale when the user gaze returns to the screen to minimize the impact on the user's experience.

As noted above, instead of, or in addition to, the participating user devices adjusting their video stream based on the user engagement score, the network can adjust the resources, e.g., QoS, assigned to a call based on the user engagement scores of the participants and other factors. For example, the network can initially assign QCI-1 to a video call for maximum bit rate and lowest latency where a high ranking user, a user with low mobility, high-end devices, or a combination of these, are present. If the scoring changes during the call, the network can downscale the QCI, or upscale it back based on the scoring. In addition, as will be described further herein, for new calls, the network can take heuristics into account and start a new call off with an aggressive or conservative QCI.

Figure 5B:
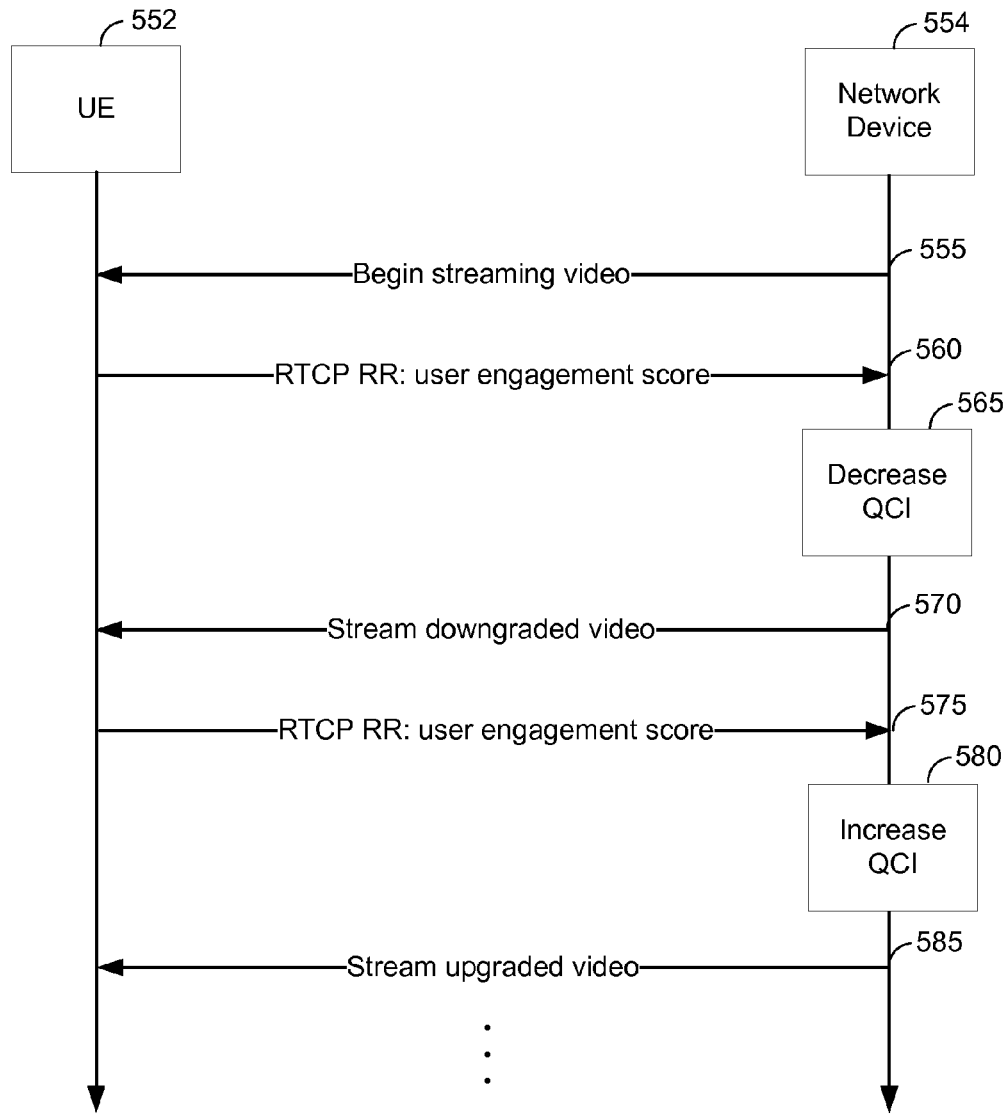
FIG. 5B illustrates an exemplary embodiment in which one or more UEs participating in a video call send their user engagement scores to a network device and, in response, the network device adjusts the Quality of Service (QoS) Class Identifier (QCI) assigned to the video call.

FIG. 5B illustrates an exemplary embodiment in which one or more UEs 552 participating in a video call send their user engagement scores to a network device 554 and, in response, the network device 554 adjusts the QCI assigned to the video call. The network device may be a server, such as application server 170 in FIG. 1, an existing component of the RAN 120 or the core network 140 configured to perform the functionality described herein, or a new logical entity within either the RAN 120 or the core network 140 configured to perform the functionality described herein.

At 555, the network device 554 begins transmitting a video stream to the one or more UEs 552. The network device 554 may assign a default QCI as the initial QCI for the video stream, or, as described further below, may assign a dynamic QCI based on heuristics related to the one or more UEs 552. As in FIG. 5A, in FIG. 5B, each of the one or more UEs 552 periodically calculates its user engagement score based on multiple factors, described below, and assigns a timestamp indicating the time the user engagement score was calculated. At 560, the one or more UEs 552 send their most recent calculated user engagement scores in an RTCP field in an RR, for example. When the network device 554 receives the RTCP information, the network device 554 may, at 565, adjust the QCI assigned to the video stream based on the received user engagement scores and one or more other factors, as described further below. In the example of FIG. 5B, the network device 554 decreases the QCI assigned to the video stream. At 570, the network device 554 transmits the downgraded video stream.

At the next interval (which may be a periodic interval or may be triggered by an event, such as where the network is congested and needs to make optimal usage of the resources), the one or more UEs 552 again calculate their respective user engagement scores. The one or more UEs 552 may calculate their respective user engagement scores on their own initiative, or upon request from the network device 554. At 575, the one or more UEs 552 send their most recently calculated user engagement scores to the network device 554. The one or more UEs 552 may send their user activity scores every time they are calculated, or less frequently. In the example of FIG. 5B, the users' attention has returned to the call. As such, the exchanged user engagement scores are higher, and at 580, the network device 554 upgrades the QCI assigned to the video call. At 585, the network device 554 transmits the upgraded video stream.

Note that although FIGS. 5A and 5B illustrate a video call, as will be appreciated, the call may be a VoIP call, a VoLTE call, a near-real-time online gaming application, an interactive streaming session, or the like.

The user engagement score is a function of various factors relating to a user's attention to a video call in order to assign the appropriate QoS/QCI. For example, the user engagement score may be based on one or more of the following factors:
  a. Mobility: If the user device is moving around, such as where the user is walking or driving, then higher video quality is not as important. The quality of the video stream could be an inverse of mobility, e.g., the more movement, the lower the video quality.
  b. Link quality: If the local link (e.g., LTE, WiFi, etc.) to which the user device is connected is of a lower quality, the video quality and/or QoS/QCI can be downgraded to that quality level. For example, if a user device is in poor network conditions, that would take precedence in determining the video quality and/or network resources to assign to that user device.
  c. Activity of the user around the user device's cameras: For example, a user device can use face plane detection to ascertain if the user is looking at the screen. Alternatively, other device(s) on the same network as the user device can ascertain if the user is engaged in the current video call or is focusing elsewhere (e.g., watching TV while on a video call). As another example, the user may be projecting the user device's screen, and thus, although not looking at the user device, is fully engaged in the video call.
d. Whether the user is sharing media on the video call: For example, one user may share his or her desktop while others view it. In that case, the user sharing the desktop would have a higher user engagement score.
e. Microphone activity (for scaling voice stream if applicable): For example, the user engagement score can take into account whether the user is speaking on the call, to someone else in the same room (and therefore not to other participants on the call), or not speaking
f. Visual and verbal cues: For example, whether the user is looking at the screen (using the back facing camera, if the user device is so equipped), or based on keywords the user speaks, such as "be right back," etc.

The video quality and/or QoS/QCI assigned to a call may also be based on heuristics/history of the user or groups of users participating on the call, depending on whether the participating devices are adjusting the video quality based on the user engagement scores received from the other devices or whether the network is adjusting the QoS/QCI assigned to the call. User engagement scores of individual users or groups of users can be tracked over time and aggregated. For example, if a user is known to be less engaged, more mobile, etc., then the first user engagement score calculated by the user device for that user for a new video call will be lower than it otherwise might be, and thus, the video call will start off with a lower quality video and/or lower QoS/QCI. This applies to group calls as well. For example, if a weekly conference call is relatively inactive for the first five minutes every week, the network can assign only conservative QoS/QCI for the first five minutes.

Additionally, user history data can be used to create user engagement relationship maps to predetermine the user's engagement score based on past interactions. For example, if a first user has always had a lower engagement score when communicating with a family member but is always engaged with a business associate, that information can be used to assign an initial engagement score.

As briefly mentioned above, the network may adjust the QoS/QCI for an entire group of users on a group call, or for individual users on a group call. The network may make such adjustments based on the user engagement scores received from the users and, optionally, other factors, such as the heuristics discussed above. For example, the network may calculate F(quality, user_A) and/or F(quality, group_G). F(quality, user_A) controls the video/voice quality downlink feed to a particular user A, given the user engagement score from user A's user device and/or heuristics related to user A. F(quality, group_G) controls the video/voice quality downlink feed as a constant to each member of the group based on user engagement scores and/or heuristics of that group, averaged across device profiles (e.g., all tablets, vs. all small screen phones).

Figure 6:
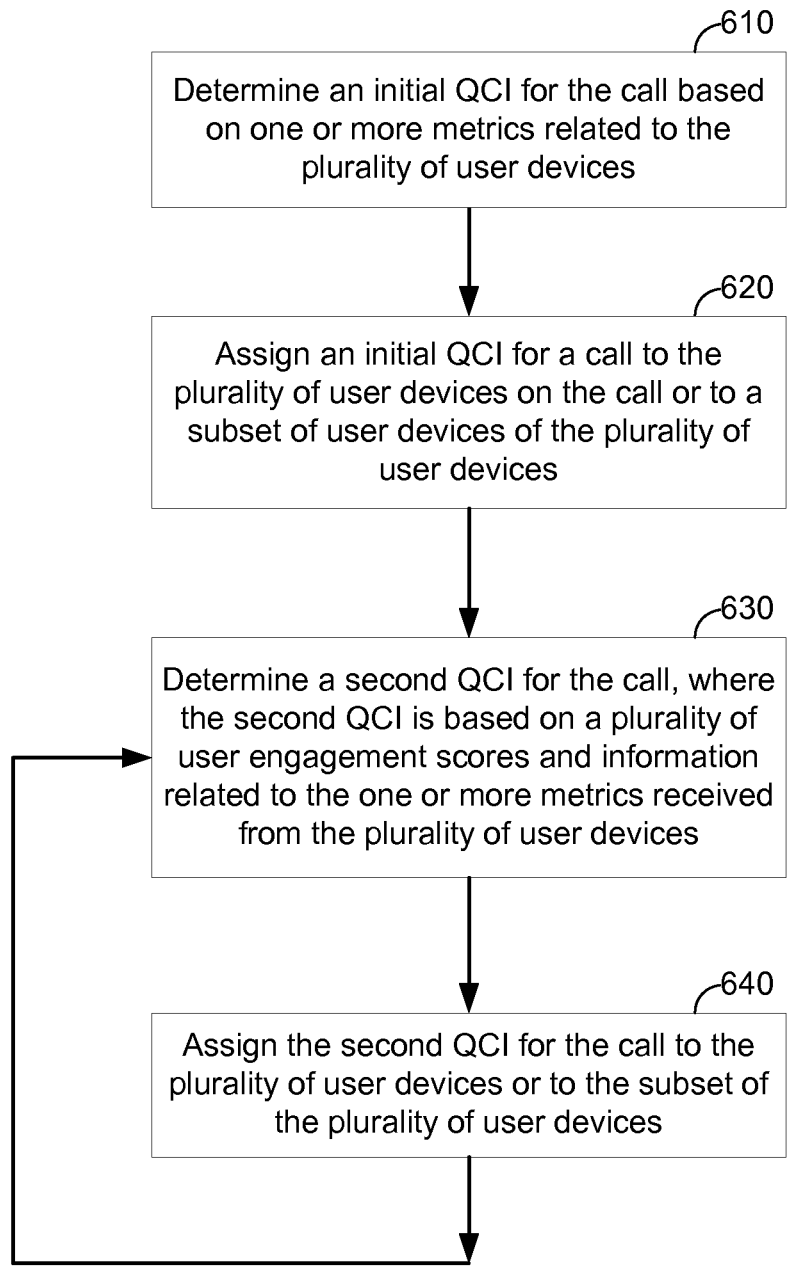
FIG. 6 illustrates an exemplary flow for assigning a variable QCI for a call among a plurality of user devices according to at least one aspect of the disclosure.

The network may adjust the network resources assigned to a group call by changing the QCI assigned to all or a subset of the participants on the call. FIG. 6 illustrates an exemplary flow for assigning a variable QCI for a call among a plurality of user devices according to at least one aspect of the disclosure. The flow illustrated in FIG. 6 may be performed by any network entity responsible for assigning QCI to a call, such as the apparatus 406 in FIG. 4 where the apparatus 406 corresponds to the application server 170, an existing component of the RAN 120 or the core network 140 configured to perform the functionality described herein, such as the P-GW 235A, the GGSN, the SGSN, etc., or a new logical entity within either the RAN 120 or the core network 140 configured to perform the functionality described herein. The call may be a video call, a Voice over Internet Protocol (VoIP) call, a Voice over LTE (VoLTE) call, a near real-time online gaming application, an interactive stream, or the like.

At 610, the network entity, or more specifically, the variable QCI assignment module 456, determines an initial QCI for the call based on one or more metrics related to the plurality of user devices. The determination may include receiving an assignment of the second QCI from a server in communication with the plurality of user devices, such as the application server 170.

At 620, the network entity, or more specifically, the variable QCI assignment module 456, assigns the initial QCI for the call to the plurality of user devices (which may correspond to apparatus 402 in FIG. 4) or to a subset of the plurality of user devices (which may be less than all and as few as one of the plurality of user devices). The initial QCI may be the first QCI assigned to the call. Unlike conventional techniques, where the initial QCI for a call is a default QCI, e.g., QCI-1, the initial QCI is dynamically determined and assigned based on one or more metrics related to the plurality of user devices. The one or more metrics may include the heuristics described above, and other metrics. For example, the one or more metrics may include:
a. Device profile/capabilities: Screen size, display quality (pixels per inch, color depth, etc.), ambient lighting (e.g., if the user device is in bright sunlight, the user will not be able to see the screen very well, and thus, higher video quality is not as important), etc. If the user device is a "higher profile," it can expect higher QoS.
b. User rank/importance: If a high ranking user is on a group call, the other devices and/or the network can ensure higher quality video/audio. The user's importance may be based on the user's role, for example, or the user's subscription services. For example, a user may have a premium subscription service that entitles the user to a higher level of QoS.
c. User role: Different user roles may require different levels of network resources. Roles may include Organizer, Presenter, Moderator, Passive Consumer, Active Consumer, Passive Participant, Active Participant, etc.
d. Location of the device: For example, if there are 10 participants in a conference room and one person working remotely, the person working remotely may be assigned higher network resources that the participants in the conference room.
e. History information: The history of participant interaction on similar calls can be used to assign QoS to the call. For example, as noted above, if a weekly conference call is relatively inactive for the first five minutes every week, the network can assign a lower QoS for the first five minutes.

In an embodiment, the initial QCI for the subset of user devices may be a dynamically assigned QCI based on any information related to the one or more metrics known by the network entity at the time of the initial QCI assignment, and the initial QCI for the remaining user devices of the plurality of user devices may be a default QCI. For example, the network entity may know from identifiers of the plurality of user devices obtained during call setup the importance of the various users on the call, the general location of the user devices, the historical activity of the users on the call, the typical roles of the users on the call, the capabilities of the user devices, and the like. Alternatively, the network entity may assign an initial dynamic QCI to the subset of user devices based on the one or more metrics and a dynamic initial QCI for the remaining user devices of the plurality of user devices based on the one or more metrics. The initial dynamic QCI for the subset of user devices may be the same or different as the dynamic initial QCI for the remaining user devices depending on the one or more metrics.

At 630, the network entity determines a second QCI for the call. The second QCI may be based on a plurality of user engagement scores and information related to the one or more metrics received from the plurality of user devices (as discussed herein, each of the plurality of user devices sends a user engagement score and information related to the one or more metrics). As described above, a user engagement score is based on a plurality of factors and indicates the level of the user's engagement with the call. The user engagement score may be a numerical value (e.g., a number from 1 to 10) or a vector indicating a separate value for each of the plurality of factors. For example, where the factors are whether the user is looking at the screen of the user device, the mobility level of the user device, and whether the user is using a front camera of the user device, the vector may be (1, 4, 0), where "1" indicates that the user is looking at the screen, "4" indicates the mobility level of the user device on a scale of 1 to 10, and "0" indicates that the user is not using a front camera of the user device. As will be appreciated by those skilled in the art, there are any number of ways to represent the user engagement score and/or the various factors used to calculate the user engagement score.

The information related to the one or more metrics may be any information necessary to calculate or update the one or more metrics, such as the device profile/capabilities, the user's role on the call, the location of the user device, an identifier of the user device (if not already known by the network entity), etc. If the network has not already done so, the identifier of the user device may be used to lookup the user device in a database to determine historical call activity of the device, the importance of the user, the user's subscription level, the device profile, and the like. In fact, in an embodiment, the information related to the one or more metrics may be only the identifier of the user device and the location of the user device, and the network entity can then obtain all other relevant information related to the one or more metrics from the database.

As noted above, however, the network entity may already know the identifiers of the plurality of user devices, as is typical during call setup. In that case, the network entity can simply look up most of the information related to the one or more metrics when assigning the initial QCI, and the information related to the one or more metrics received from the plurality of devices may simply be finer grained locations of the user devices and/or any information related to the one or more metrics that may change during a call, such as the user's roles, the user devices' profiles (e.g., environmental factors such as bright sunlight on the display), etc.

At 640, the network entity assigns the second QCI for the call to the plurality of user devices or to the subset of the plurality of user devices. In an embodiment, the network entity may assign the second QCI to the subset of user devices, and the second QCI may be determined based on a comparison of user engagement score(s) of the subset of the plurality of user devices to the user engagement scores of the remaining plurality of user devices, and maintain the initial QCI for the remaining user devices of the plurality of user devices. In another embodiment, the network entity may assign the second QCI to the subset of user devices, and the second QCI may be determined based on the information related to the one or more metrics for the subset of the plurality of user devices as compared to the information related to the one or more metrics for the remaining plurality of user devices, and maintain the initial QCI for the remaining user devices of the plurality of user devices. In yet another embodiment, the network entity may assign the second QCI to the subset of user devices, and the second QCI may be determined based on both the user engagement scores and the information related to the one or more metrics.

In an embodiment, rather than maintain the initial QCI for the remaining ones of the plurality of user devices, the network entity may determine and assign a third QCI different from the second QCI to the remaining ones of the plurality of user devices based on the plurality of user engagement scores and/or the information related to the one or more metrics. The third QCI may be higher or lower than the second QCI.

In an embodiment, the network entity may assign the second QCI for the call to all of the plurality of user devices, and the second QCI may be determined based on the plurality of user engagement scores and/or the one or more metrics related to the plurality of user devices. In that case, the second QCI may be assigned based on an average, or some other aggregation, of the plurality of user engagement scores.

After 640, the flow returns to 630, where the network entity again determines a subsequent QCI. The plurality of user devices will report their user engagement scores and the information related to the one or more metrics periodically for the duration of the call. The plurality of user devices may report their user engagement scores and the information related to the one or more metrics at the same or different rates. Depending on how frequently the plurality of user devices report their user engagement scores and the information related to the one or more metrics, the network entity may assign a new QCI (or determine whether a new QCI is warranted) each time it receives new user engagement scores and information related to the one or more metrics, or may do so only periodically based on the user engagement scores and information related to the one or more metrics received since the last time it updated the QCI.

When assigning a subsequent QCI, the network entity may only adjust the QCI one level at a time to prevent significant changes to the users' experience. For example, the QCI may change from "2" to "3" to "4," then back to "3," and so on.

Although not illustrated in FIG. 6, the network entity may receive a request for the initial QCI from a user device of the plurality of user devices. If consistent with that user's service subscription and available network resources, the network entity may set the initial QCI to the requested QCI.

Additionally, in an embodiment, the UE can attempt to override the QCI (whether the initial QCI or a subsequent QCI) assigned/determined by the network entity by explicitly notifying the network entity of the QCI required for the call. For example, the UE can send a force_request to the network entity with the requested QCI value for the call with additional parameters justifying the request. The network entity can honor the request if possible, or if not, deny it and assign the next highest QCI it is able to assign.

As will be appreciated, the mechanisms disclosed herein can also be applied to Video Telephony in IMS (VT-IMS) over a dedicated bearer (e.g., QCI-2) or Best Effort (BE) services (no QoS guarantee, typically maps to QCI 8 or 9 and includes internet traffic). By using the mechanisms disclosed herein, bandwidth can be conserved, cell load capacity can be eased off, power usage can be decreased by decreasing the computation load on the codec, etc.

Figure 7:
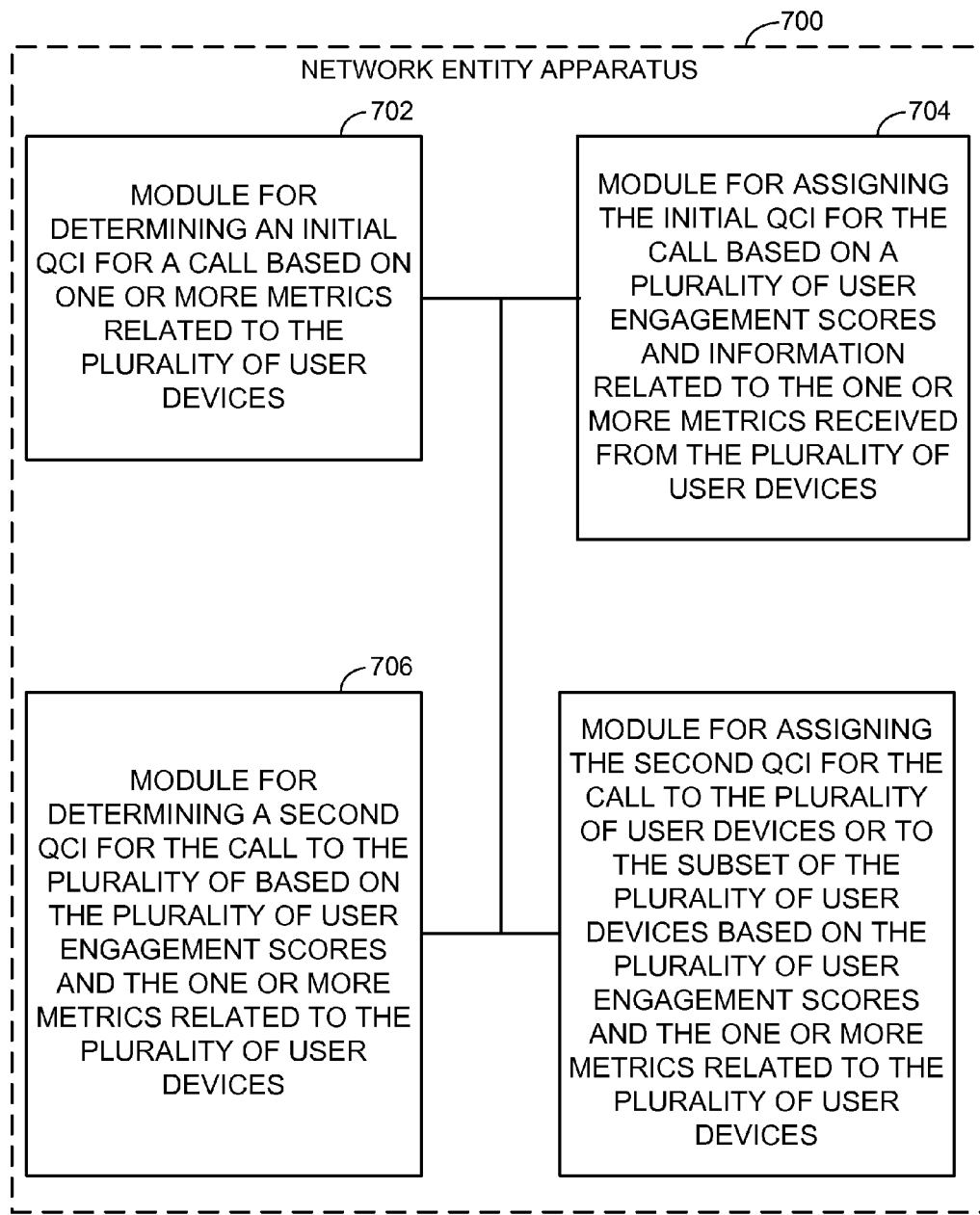
FIG. 7 is a simplified block diagrams of several sample aspects of an apparatus configured to support communication as taught herein.

FIG. 7 illustrates an example base station apparatus 700 represented as a series of interrelated functional modules. A module for assigning 702 may correspond at least in some aspects to, for example, a processing system, such as processing system 436 and variable QCI assignment module 456, as discussed herein. A module for receiving 704 may correspond at least in some aspects to, for example, a processing system, such as processing system 436 and variable QCI assignment module 456, as discussed herein. A module for assigning 706 may correspond at least in some aspects to, for example, a processing system, such as processing system 436 and variable QCI assignment module 456, as discussed herein.

Alternatively, the module for assigning 702 may correspond at least in some aspects to, for example, a processing system in conjunction with a communication device, such as processing system 436 and variable QCI assignment module 456 in conjunction with transmitter 428, as discussed herein. The module for receiving 704 may correspond at least in some aspects to, for example, a communication device in conjunction with a processing system, such as receiver 430 in conjunction with processing system 436 and variable QCI assignment module 456, as discussed herein. The module for assigning 706 may correspond at least in some aspects to, for example, a processing system in conjunction with a communication device, such as processing system 436 and variable QCI assignment module 456 in conjunction with transmitter 428, as discussed herein.

The functionality of the modules of FIG. 7 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 7, as well as other components and functions described herein, may be implemented using any suitable means. Such means also may be implemented, at least in part, using corresponding structure as taught herein. For example, the components described above in conjunction with the "module for" components of FIG. 7 also may correspond to similarly designated "means for" functionality. Thus, in some aspects one or more of such means may be implemented using one or more of processor components, integrated circuits, or other suitable structure as taught herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the disclosure, it should be noted that various changes and modifications could be made herein without departing from the scope of the disclosure as defined by the appended claims. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated.

What is claimed is:

1. A method of assigning a variable Quality of Service (QoS) Class Identifier (QCI) for a call among a plurality of user devices, comprising:
   determining, by a network entity, an initial QCI for the call based on one or more metrics related to the plurality of user devices;
   assigning, by the network entity, the initial QCI for the call to the plurality of user devices or to a first user device of the plurality of user devices;
   determining, at the network entity, a second QCI for the call, wherein the second QCI is based on a plurality of user engagement scores and information related to the one or more metrics received from the plurality of user devices, and wherein each user engagement score of the plurality of user engagement scores is based on a plurality of factors and indicates a level of engagement with the call of a user of a user device of the plurality of user devices from which the user engagement score was received, and wherein the plurality of factors comprises one or more of whether or not a user of a user device of the plurality of user devices is looking at a screen of the user device, whether or not the user is actively using another device, how frequently the user looks at the screen of the user device, audible phrases of the user within the call, change in volume of the user's voice, whether or not the user is using a front camera of the user device, mobility of the user device, a history of user interaction with calls on the user device, or a type of network to which the user device is connected; and
   assigning, by the network entity, the second QCI for the call to the plurality of user devices or to the first user device of the plurality of user devices.

2. The method of claim 1, wherein the call comprises a video call, a Voice over Internet Protocol (VoIP) call, a Voice over Long Term Evolution (VoLTE) call, a near-real-time online gaming application, or an interactive streaming session.

3. The method of claim 1, wherein assigning the second QCI for the call comprises assigning the second QCI for the call to the first user device of the plurality of user devices, and wherein the second QCI is determined based on a comparison of a user engagement score of the first user device to remaining user engagement scores of the plurality of user engagement scores.

4. The method of claim 3, further comprising:
   determining a third QCI different from the second QCI for remaining ones of the plurality of user devices based on the plurality of user engagement scores.

5. The method of claim 4, wherein the second QCI is higher than the third QCI based on one or more of a priority of the first user device being higher than priorities of the remaining ones of the plurality of user devices, a role of the first user device on the call being more important than roles of the remaining ones of the plurality of user devices, an activity level of the first user device being higher than activity levels of the remaining ones of the plurality of user devices, a location of the first user device being more important than locations of the remaining ones of the plurality of user devices, a media sharing status of the first user device indicating that the first user device is sharing media, or an indication from the first user device that it will pay for the second QCI.

6. The method of claim 1, wherein assigning the second QCI for the call comprises assigning the second QCI for the call to the plurality of user devices, and wherein the second QCI is determined based on the plurality of user engagement scores and the information related to the one or more metrics.

7. The method of claim 6, wherein the second QCI is determined based on an average of the plurality of user engagement scores.

8. The method of claim 1, further comprising receiving a request for the initial QCI from a user device of the plurality of user devices.

9. The method of claim 1, wherein the initial QCI is assigned at a beginning of the call.

10. The method of claim 1, wherein the one or more metrics comprise one or more of an importance of one or more participants on the call, device profiles of the plurality of user devices, roles of the one or more participants, locations of the plurality of user devices, or a history of participant interaction for similar calls.

11. The method of claim 1, wherein the determining the second QCI comprises receiving an assignment of the second QCI from a server in communication with the plurality of user devices.

12. The method of claim 11, wherein the network entity comprises a component of a radio access network (RAN) coupled to the server.

13. The method of claim 1, wherein the determining the initial QCI comprises receiving an assignment of the initial QCI from a server in communication with the plurality of user devices.

14. The method of claim 1, wherein at least one of the plurality of user devices sends a request to override the initial QCI or the second QCI.

15. The method of claim 14, wherein the request comprises a QCI required for the call and one or more parameters justifying the request.

16. An apparatus for assigning a variable Quality of Service (QoS) Class Identifier (QCI) for a call among a plurality of user devices, comprising:
   at least one processor configured to:
      determine an initial QCI for the call based on one or more metrics related to the plurality of user devices;
      assign the initial QCI for the call to the plurality of user devices or to a first user device of the plurality of user devices;

determine a second QCI for the call, wherein the second QCI is based on a plurality of user engagement scores and information related to the one or more metrics received from the plurality of user devices, and wherein each user engagement score of the plurality of user engagement scores is based on a plurality of factors and indicates a level of engagement with the call of a user of a user device of the plurality of user devices from which the user engagement score was received, and wherein the plurality of factors comprises one or more of whether or not a user of a user device of the plurality of user devices is looking at a screen of the user device, whether or not the user is actively using another device, how frequently the user looks at the screen of the user device, audible phrases of the user within the call, change in volume of the user's voice, whether or not the user is using a front camera of the user device, mobility of the user device, a history of user interaction with calls on the user device, or a type of network to which the user device is connected; and assign the second QCI for the call to the plurality of user devices or to the first user device of the plurality of user devices.

17. The apparatus of claim 16, wherein the call comprises a video call, a Voice over Internet Protocol (VoIP) call, a Voice over Long Term Evolution (VoLTE) call, a near-real-time online gaming application, or an interactive streaming session.

18. The apparatus of claim 16, wherein the at least one processor being configured to assign the second QCI for the call comprises the at least one processor being configured to assign the second QCI for the call to the first user device of the plurality of user devices, and wherein the second QCI is determined based on a comparison of a user engagement score of the first user device to remaining user engagement scores of the plurality of user engagement scores.

19. The apparatus of claim 18, wherein the at least one processor is further configured to:
determine a third QCI different from the second QCI for remaining ones of the plurality of user devices based on the plurality of user engagement scores.

20. The apparatus of claim 19, wherein the second QCI is higher than the third QCI based on one or more of a priority of the first user device being higher than priorities of the remaining ones of the plurality of user devices, a role of the first user device on the call being more important than roles of the remaining ones of the plurality of user devices, an activity level of the first user device being higher than activity levels of the remaining ones of the plurality of user devices, a location of the first user device being more important than locations of the remaining ones of the plurality of user devices, a media sharing status of the first user device indicating that the first user device is sharing media, or an indication from the first user device that it will pay for the second QCI.

21. The apparatus of claim 16, wherein the at least one processor being configured to assign the second QCI for the call comprises the at least one processor being configured to assign the second QCI for the call to the plurality of user devices, and wherein the second QCI is determined based on the plurality of user engagement scores and the information related to the one or more metrics.

22. The apparatus of claim 21, wherein the second QCI is determined based on an average of the plurality of user engagement scores.

23. The apparatus of claim 16, wherein the at least one processor is further configured to receive a request for the initial QCI from a user device of the plurality of user devices.

24. The apparatus of claim 16, wherein the one or more metrics comprise one or more of an importance of one or more participants on the call, device profiles of the plurality of user devices, roles of the one or more participants, locations of the plurality of user devices, or a history of participant interaction for similar calls.

25. The apparatus of claim 16, wherein the at least one processor being configured to determine the second QCI comprises the at least one processor being configured to receive an assignment of the second QCI from a server in communication with the plurality of user devices.

26. The apparatus of claim 16, wherein at least one of the plurality of user devices sends a request to override the initial QCI or the second QCI.

27. An apparatus for assigning a variable Quality of Service (QoS) Class Identifier (QCI) for a call among a plurality of user devices, comprising:
means for determining, by a network entity, an initial QCI for the call based on one or more metrics related to the plurality of user devices;
means for assigning, by the network entity, the initial QCI for the call to the plurality of user devices or to a first user device of the plurality of user devices;
means for determining, at the network entity, a second QCI for the call, wherein the second QCI is based on a plurality of user engagement scores and information related to the one or more metrics received from the plurality of user devices, and wherein each user engagement score of the plurality of user engagement scores is based on a plurality of factors and indicates a level of engagement with the call of a user of a user device of the plurality of user devices from which the user engagement score was received, and wherein the plurality of factors comprises one or more of whether or not a user of a user device of the plurality of user devices is looking at a screen of the user device, whether or not the user is actively using another device, how frequently the user looks at the screen of the user device, audible phrases of the user within the call, change in volume of the user's voice, whether or not the user is using a front camera of the user device, mobility of the user device, a history of user interaction with calls on the user device, or a type of network to which the user device is connected; and
means for assigning, by the network entity, the second QCI for the call to the plurality of user devices or to the first user device of the plurality of user devices.

28. A non-transitory computer-readable medium for assigning a variable Quality of Service (QoS) Class Identifier (QCI) for a call among a plurality of user devices, comprising:
at least one instruction to determine, by a network entity, an initial QCI for the call based on one or more metrics related to the plurality of user devices;
at least one instruction to assign, by the network entity, the initial QCI for the call to the plurality of user devices or to a first user device of the plurality of user devices;
at least one instruction to determine, at the network entity, a second QCI for the call, wherein the second QCI is based on a plurality of user engagement scores and information related to the one or more metrics received from the plurality of user devices, and wherein each user engagement score of the plurality of user engagement scores is based on a plurality of factors and indicates a level of engagement with the call of a user of a user device of the plurality of user devices from which the user engagement score was received, and wherein the plurality of factors comprises one or more of whether or not a user of a user device of the plurality of user devices is looking at a screen of the user device, whether or not the user is actively using another device, how frequently the user looks at the screen of the user device, audible phrases of the user within the call, change in volume of the user's voice, whether or not the user is using a front camera of the user device, mobility of the user device, a history of user interaction with calls on the user device, or a type of network to which the user device is connected; and at least one instruction to assign, by the network entity, the second QCI for the call to the plurality of user devices or to the first user device of the plurality of user devices.

* * * * *